(12) United States Patent
Chen et al.

(10) Patent No.: US 11,665,318 B2
(45) Date of Patent: May 30, 2023

(54) OBJECT DETECTION APPARATUS AND METHOD

(71) Applicant: Sigmastar Technology Ltd., Xia'men (CN)

(72) Inventors: Fu-Cheng Chen, Hsinchu County (TW); Yih-Ru Tsai, Hsinchu County (TW); Po-Jung Chen, Hsinchu County (TW)

(73) Assignee: SIGMASTAR TECHNOLOGY LTD., Xia'men (CN)

( * ) Notice: Subject to any disclaimer, the term of this patent is extended or adjusted under 35 U.S.C. 154(b) by 0 days.

(21) Appl. No.: 17/539,359

(22) Filed: Dec. 1, 2021

(65) Prior Publication Data

US 2022/0377281 A1 Nov. 24, 2022

(30) Foreign Application Priority Data

May 20, 2021 (CN) .......................... 202110553938.6

(51) Int. Cl.
*H04N 7/18* (2006.01)
*H04N 23/80* (2023.01)

(52) U.S. Cl.
CPC ............. *H04N 7/18* (2013.01); *H04N 23/80* (2023.01)

(58) Field of Classification Search
None
See application file for complete search history.

(56) References Cited

U.S. PATENT DOCUMENTS

| | | | | |
|---|---|---|---|---|
| 9,064,161 | B1* | 6/2015 | Boman | G07G 1/00 |
| 10,032,283 | B2* | 7/2018 | Baltsen | G06V 20/58 |
| 10,656,275 | B1* | 5/2020 | Bills | G01S 7/4861 |
| 2005/0128291 | A1* | 6/2005 | Murakami | H04N 7/181 |
| | | | | 348/169 |
| 2012/0050024 | A1* | 3/2012 | Taylor | B60R 1/00 |
| | | | | 340/435 |
| 2018/0089980 | A1* | 3/2018 | Snyder | G06T 7/254 |
| 2019/0110047 | A1* | 4/2019 | De Muynck | H04N 19/119 |
| 2021/0117658 | A1* | 4/2021 | Taheri | G06V 40/23 |

FOREIGN PATENT DOCUMENTS

CN 106056597 A * 10/2016 ............. G06T 7/001

* cited by examiner

*Primary Examiner* — Stefan Gadomski
(74) *Attorney, Agent, or Firm* — WPAT, P.C.

(57) ABSTRACT

The present disclosure discloses an object detection method used in an object detection apparatus that includes the steps outlined below. An image signal received from an image sensor is detected to generate an image detection signal when an image variation is detected. An infrared signal received from an infrared sensor is detected to generate an infrared detection signal when an infrared energy variation is detected. A time counting process is initialized when the image detection signal is generated. An object detection signal is generated when the infrared detection signal is generated within a predetermined time period after the time counting process is initialized. A detection distance of the image sensor is larger than a detection distance of the infrared sensor.

10 Claims, 6 Drawing Sheets

OBJECT DETECTION APPARATUS AND METHOD

This application claims the benefit of China application Serial No. CN202110553938.6, filed May 20, 2021, the subject matter of which is incorporated herein by reference.

BACKGROUND OF THE INVENTION

1. Field of the Invention

The present disclosure relates to object detection technology, and more particularly to an object detection apparatus and an object detection method.

2. Description of Related Art

In order to prevent the intruders or invasion of the thieves, corporations or families usually establish a security surveillance system to provide protection. A conventional surveillance system generates analog images for human to passively observe the approaching objects. However, along with the advancement of technologies, a security surveillance system of high quality is equipped with a smart surveillance function to raise alarm without depending on human observation.

In the application of the security surveillance system, the function of detecting whether an object such as a human body approaches is very important. Nevertheless, the current technologies are not able to perform detection accurately such that misjudgment often occurs.

SUMMARY OF THE INVENTION

In consideration of the problem of the prior art, an object of the present disclosure is to provide an object detection apparatus and an object detection method to improve the prior art.

The present disclosure discloses an object detection method used in an object detection apparatus that includes the steps outlined below. An image signal received from an image sensor is detected to generate an image detection signal when an image variation is detected. An infrared signal received from an infrared sensor is detected to generate an infrared detection signal when an infrared energy variation is detected. A time counting process is initialized when the image detection signal is generated. An object detection signal is generated when the infrared detection signal is generated within a predetermined time period after the time counting process is initialized. Wherein a detection distance of the image sensor is larger than a detection distance of the infrared sensor.

The present disclosure also discloses an object detection apparatus that includes a motion detection circuit, an infrared control circuit and a confirming circuit. The motion detection circuit is configured to detect an image signal received from an image sensor to generate an image detection signal when an image variation is detected. The infrared control circuit is configured to detect an infrared signal received from an infrared sensor to generate an infrared detection signal when an infrared energy variation is detected. The confirming circuit is configured to initialize a time counting process when one of the image detection signal and the infrared detection signal is generated, and generate an object detection signal when the other one of the image detection signal and the infrared detection signal is generated within a predetermined time period after the time counting process is initialized.

The present disclosure further discloses an object detection method used in an object detection apparatus that includes the steps outlined below. An image signal received from an image sensor is detected to generate an image detection signal when an image variation is detected. An infrared signal received from an infrared sensor is detected to generate an infrared detection signal when an infrared energy variation is detected. A time counting process is initialized when one of the image detection signal and the infrared detection signal is generated. An object detection signal is generated when the other one of the image detection signal and the infrared detection signal is generated within a predetermined time period after the time counting process is initialized.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An object of the present disclosure is to provide an object detection apparatus and an object detection method to greatly reduce the possibility of misjudgment by using the cooperative detecting mechanism of the image sensor and the infrared sensor to further avoid unnecessary power dissipation.

Figure 1:
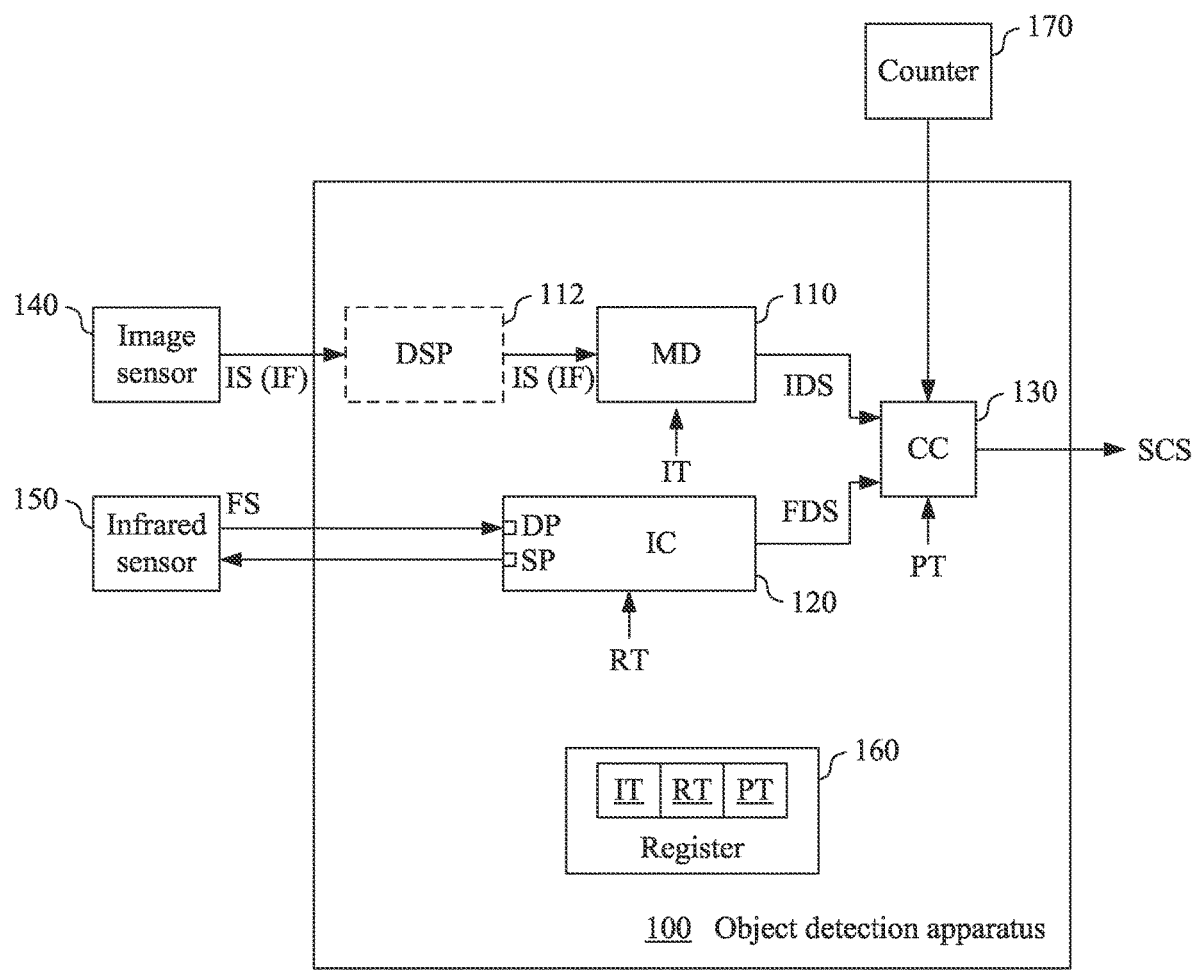
FIG. 1 illustrates a block diagram of an object detection apparatus according to an embodiment of the present invention.

Reference is now made to FIG. 1. FIG. 1 illustrates a block diagram of an object detection apparatus 100 according to an embodiment of the present invention. The object detection apparatus 100 is configured to detect whether an approaching object, e.g., human body, exists within a neighboring area of the object detection apparatus 100. The object detection apparatus 100 includes a motion detection circuit 110 (abbreviated as MD in FIG. 1), an infrared control circuit 120 (abbreviated as IC in FIG. 1) and a confirming circuit 130 (abbreviated as CC in FIG. 1).

The operation of the motion detection circuit 110 is further described in detail in the following paragraphs.

The motion detection circuit 110 is configured to detect an image signal IS received from an image sensor 140 to generate an image detection signal IDS when an image variation is detected.

In an embodiment, the image sensor 140 is disposed independently from the object detection apparatus 100. The image sensor 140 includes a light-sensing element (not illustrated) to retrieve a plurality of images IF to further generate the image signal IS such that the motion detection circuit 110 receives the image signal IS.

The motion detection circuit 110 may selectively receive the image signal IS through a digital signal processing circuit 112 (abbreviated as DSP in FIG. 1). The digital signal processing circuit 112 is disposed between the image sensor 140 and the motion detection circuit 110 and is configured to perform image optimization process on the images IF in the image signal IS. The image optimization process may include such as, but not limited to, image enhancement, image brightness adjustment, image noise reduction or a combination thereof. It is appreciated that in some embodiments, the motion detection circuit 110 may also directly receive the image signal IS from the image sensor 140 without the processing of the digital signal processing circuit 112.

In an embodiment, the motion detection circuit 110 calculates an image variation amount according to the images IF in the image signal IS and determines whether the image variation amount is larger than an image variation threshold IT. In an embodiment, the object detection apparatus 100 further includes a register 160 configured to store the image variation threshold IT for the motion detection circuit 110 to perform determination. In order to make the figure clear, the register 160 is not illustrated to be coupled to the motion detection circuit 110 in FIG. 1. However, in actual implementation, the motion detection circuit 110 is coupled to the register 160 to access the image variation threshold IT.

When the motion detection circuit 110 determines that the image variation amount is larger than the image variation threshold IT, the motion detection circuit 110 generates an image detection signal IDS.

Figure 2:
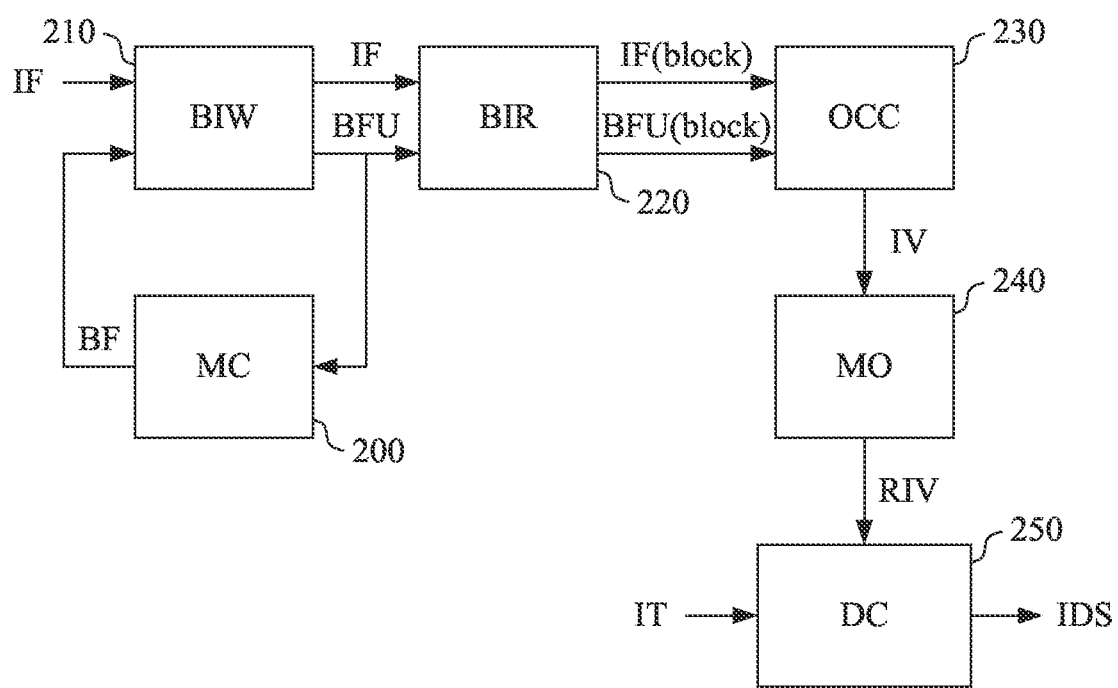
FIG. 2 illustrates a block diagram of the motion detection circuit according to an embodiment of the present invention.

Reference is now made to FIG. 2. FIG. 2 illustrates a block diagram of the motion detection circuit 110 according to an embodiment of the present invention. In the present embodiment, the motion detection circuit 110 includes a memory circuit 200 (abbreviated as MC in FIG. 2), a background image weighting calculation circuit 210 (abbreviated as BIW in FIG. 2), a block image retrieving circuit 220 (abbreviated as BIR in FIG. 2), an offset calculation circuit 230 (abbreviated as OCC in FIG. 2), a mask operation circuit 240 (abbreviated as MO in FIG. 2) and a determining circuit 250 (abbreviated as DC in FIG. 2).

The memory circuit 200 is configured to store a background image BF. The background image weighting calculation circuit 210 retrieves the background image BF from the memory circuit 200 and set a weighting of the background image BF to perform calculation to generate a weighted background image BFU.

In an embodiment, the background image weighting calculation circuit 210 performs weighting operation on the background image BF simultaneously according to the current image IF and the corresponding weighting. For example, when the pixel value of the current image IF is IF(x, y) and the weighting is w1, and the pixel value of the background image BF is BF(x, y) and the weighting is w2, the weighted background image BFU calculated by the background image weighting calculation circuit 210 is w1×IF(x, y)+w2×BF(x, y). The weightings w1 and w2 can be set to different values according to different conditions (e.g., a pixel value difference between the current image IF and the background image BF).

In an embodiment, the weighted background image BFU is fed back to the memory circuit 200 and is stored therein as the background image BF corresponding to calculation of the next image IF.

The block image retrieving circuit 220 receives the current image IF and the weighted background image BFU and retrieves corresponding image blocks therefrom such that the offset calculation circuit 230 performs calculation thereon. In another embodiment, the block image retrieving circuit 220 receives the current image IF and the background image BF and retrieves corresponding image blocks therefrom such that the offset calculation circuit 230 performs calculation thereon. In different embodiments, the size of the image block ranges from a single pixel to a larger blocks including a plurality of pixels.

The offset calculation circuit 230 is configured to perform a sum of absolute differences (SAD) calculation according to the weighted background image BFU and the current image IF by using the corresponding block as a unit to generate the image variation amount IV. In another embodiment, the offset calculation circuit 230 is configured to perform a sum of absolute differences calculation according to the background image BF and the current image IF by using the corresponding block as a unit to generate the image variation amount IV.

The mask operation circuit 240 is configured to apply a mask on the image variation amount IV to mask the values outside of a region of interest (ROI) to generate a ROI image variation amount RIV.

The determining circuit 250 further performs determination on the ROI image variation amount RIV, so as to generate the image detection signal IDS when the ROI image variation amount RIV is larger than the image variation threshold IT.

The operation of the infrared control circuit 120 is described in detail in the following paragraphs.

The infrared control circuit 120 is configured to detect an infrared signal FS received from an infrared sensor 150 to generate an infrared detection signal FDS when an infrared energy variation is detected.

In an embodiment, the infrared sensor 150 is disposed independently from the object detection apparatus 100. The infrared sensor 150 is configured to deliver and receive infrared light to generate the infrared signal FS such that the infrared control circuit 120 receives the infrared signal FS.

The infrared control circuit 120 may be electrically coupled to the infrared sensor 150 through such as, but not limited to, a setting pin SP and a direct link pin DP. The infrared control circuit 120 may set up the infrared sensor 150 through the setting pin SP and receive the infrared signal FS from the infrared sensor 150 through the direct link pin DP.

In an embodiment, the infrared control circuit 120 calculates the infrared energy variation amount according to the infrared signal FS and determines whether the infrared energy variation amount is larger than an infrared energy variation threshold RT. In an embodiment, the register 160 is further configured to store the infrared energy variation threshold RT for the infrared control circuit 120 to perform determination. In order to make the figure clear, the register 160 is not illustrated to be coupled to the infrared control circuit 120 in FIG. 1. However, in actual implementation, the infrared control circuit 120 is coupled to the register 160 to access the infrared energy variation threshold RT.

When the infrared control circuit 120 determines that the infrared energy variation amount is larger than the infrared energy variation threshold RT, the infrared control circuit 120 generates the infrared detection signal FDS. In an embodiment, the infrared detection signal FDS is implemented as an interrupt signal.

The operation of the confirming circuit 130 is described in detail in the following paragraphs.

The confirming circuit 130 initializes a time counting process when one of the image detection signal IDS and the infrared detection signal FDS is determined to be generated. Further, the confirming circuit 130 generates an object detection signal SCS when the other one of the image detection signal IDS and the infrared detection signal FDS is generated within a predetermined time period after the time counting process is initialized. In an embodiment, a predetermined value PT of the predetermined time period can be such as, but not limited to, 2-5 seconds.

Figure 3:
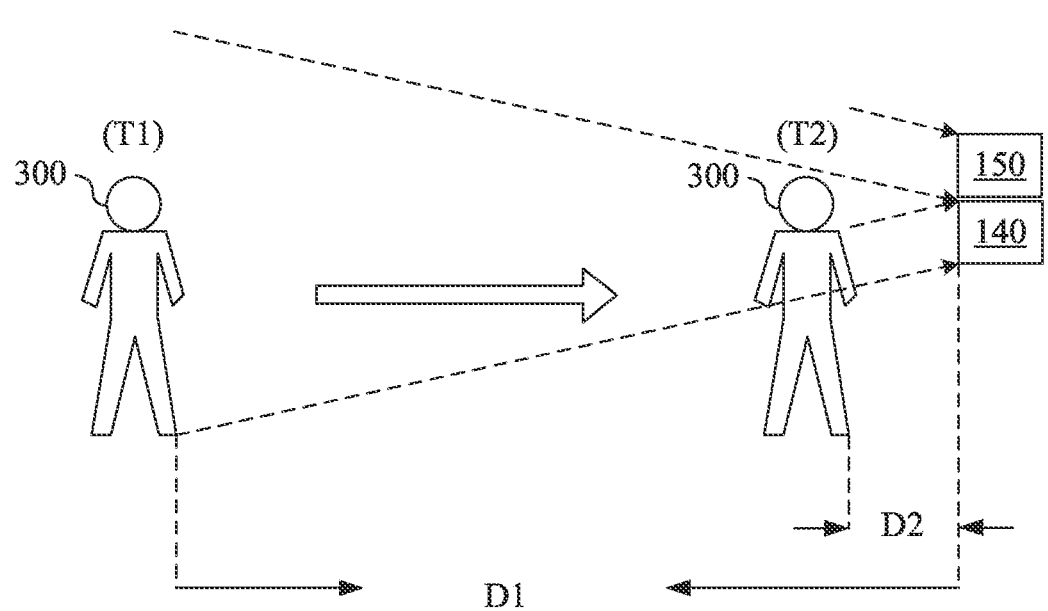
FIG. 3 illustrates a schematic diagram of the image sensor and the infrared sensor under a usage scenario according to an embodiment of the present invention.

Reference is now made to FIG. 3. FIG. 3 illustrates a schematic diagram of the image sensor 140 and the infrared sensor 150 under a usage scenario according to an embodiment of the present invention. The operation of the object detection apparatus 100 under such a usage scenario is exemplarily described in the following paragraphs in accompany with FIG. 1 and FIG. 3.

In an embodiment, the image sensor 140 and the infrared sensor 150 are disposed at a same location to perform detection on the object 300.

In an embodiment, a detection distance of the image sensor 140 is larger than a detection distance of the infrared sensor 150. For example, a detection distance of the image sensor 140 is D1 (e.g., 10 meters), and a detection distance of the infrared sensor 150 is D2 (e.g., 3 meters). As a result, at a time point T1, the distance between the object 300 and the image sensor 140 becomes D1 such that the motion detection circuit 110 detects the image variation of the image signal IS to further generate the image detection signal IDS. Further, the confirming circuit 130 initializes the time counting process accordingly.

At a time point T2, the distance between the object 300 and the infrared sensor 150 becomes D2 such that the infrared control circuit 120 detects the infrared energy variation of the infrared signal FS to further generate the infrared detection signal FDS. When the difference between the time point T2 and the time point T1 is within the predetermined time period, the confirming circuit 130 generates the object detection signal SCS.

In an embodiment, the register 160 is further configured to store the predetermined value PT of the predetermined time period for the confirming circuit 130 to perform determination. In order to make the figure clear, the register 160 is not illustrated to be coupled to the confirming circuit 130 in FIG. 1. However, in actual implementation, the confirming circuit 130 is coupled to the register 160 to access the predetermined value PT.

In an embodiment, the time counting process described above can be performed by the confirming circuit 130 by using a counter 170. The counter 170 can be selectively disposed outside of the object detection apparatus 100 or inside of the object detection apparatus 100.

In an embodiment, the confirming circuit 130 terminates the time counting process when the object detection signal SCS is generated within the predetermined time period after the time counting process is initialized. On the other hand, the confirming circuit 130 terminates the time counting process when the infrared detection signal FDS is not generated within the predetermined time period after the time counting process is initialized.

It is appreciated that the embodiment described above is merely an example. In other embodiments, under a proper design, the object detection apparatus 100 may also initialize the time counting process when the infrared detection signal FDS is generated and generates the object detection signal SCS when the image detection signal IDS is generated within a predetermined time period after the time counting process is initialized.

As a result, the object detection apparatus 100 can initialize the time counting process at first when one of the image detection signal IDS and the infrared detection signal FDS is generated, and confirms the detection of the approaching object when the other one of the image detection signal IDS and the infrared detection signal FDS is generated within a predetermined time period after the time counting process is initialized, so as to generate the object detection signal SCS. Such a design greatly reduces the possibility of misjudgment, in which the occurrence of misjudgment is highly possible when only one detecting mechanism is used.

Figure 4:
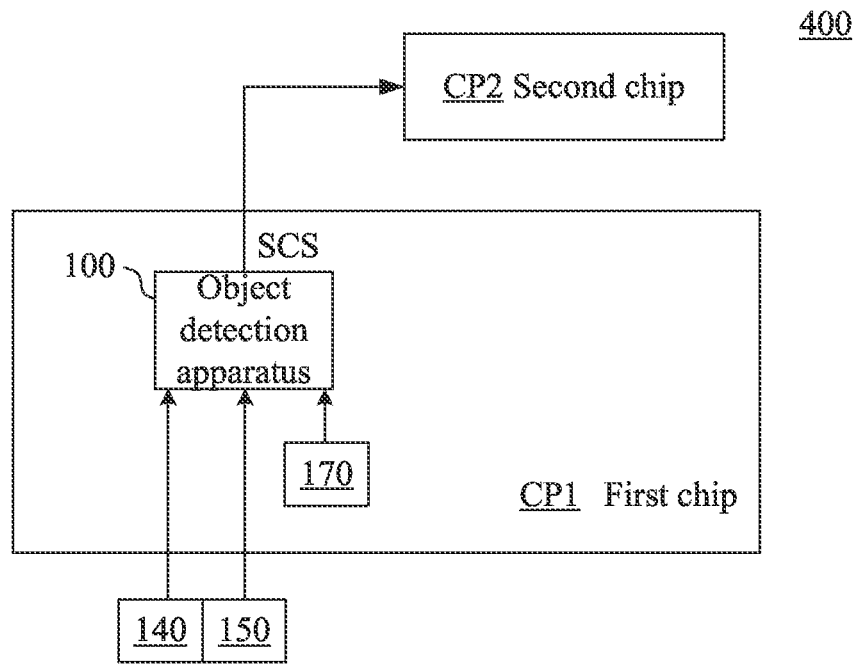
FIG. 4 illustrates a block diagram of an electronic device that is equipped with the object detection apparatus according to an embodiment of the present invention.

Reference is now made to FIG. 4. FIG. 4 illustrates a block diagram of an electronic device 400 that is equipped with the object detection apparatus 100 according to an embodiment of the present invention. The electronic device 400 includes a first chip CP1 and a second chip CP2. The second chip CP2 has a data processing ability and a power dissipation higher than those of the first chip CP1.

The object detection apparatus 100 is disposed in the first chip CP1. In an embodiment, the counter 170 may also be disposed in the first chip CP.

In an embodiment, for the object detection apparatus 100, the confirming circuit 130 transmits the object detection signal SCS to the second chip CP2 when the confirming circuit 130 detects the approaching object, in which the object detection signal SCS acts as a wake-up signal to wake up the second chip CP2 to perform processing accordingly.

Since the object detection apparatus 100 of the present invention has the cooperative detecting mechanism of the motion detection circuit 110 and the infrared control circuit 120, the possibility of misjudgment can be greatly reduced such that the unnecessary power dissipation that occurs when the second chip CP2 having high power dissipation is falsely woken up can be avoided.

Figure 5:
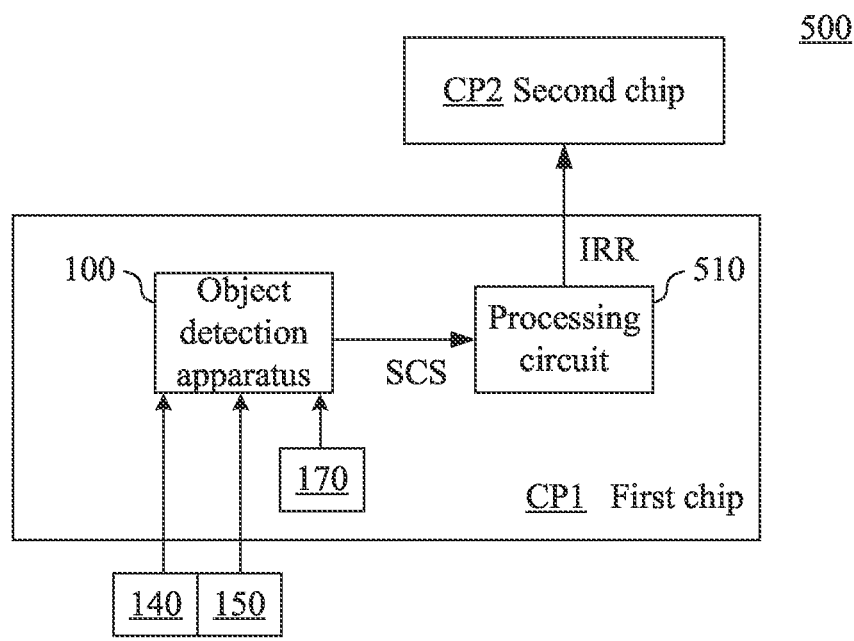
FIG. 5 illustrates a block diagram of an electronic device that is equipped with the object detection apparatus according to another embodiment of the present invention.

Reference is now made to FIG. 5. FIG. 5 illustrates a block diagram of an electronic device 500 that is equipped with the object detection apparatus 100 according to another embodiment of the present invention. The electronic device 500 includes a first chip CP1 and a second chip CP2. The second chip CP2 has a data processing ability and a power dissipation higher than those of the first chip CP1.

Similar to the embodiment illustrated in FIG. 4, the object detection apparatus 100 is disposed in the first chip CP1. However, in the present embodiment, the first chip CP1 further includes a processing circuit 510. For the object detection apparatus 100, the confirming circuit 130 transmits the object detection signal SCS to the processing circuit 510 when the confirming circuit 130 detects the approaching object.

The processing circuit 510 can make further confirmation based on the object detection signal SCS such that the processing circuit 510 generates an interrupt signal IRR to wake up the second chip CP2 to perform processing accordingly when the approaching object is confirmed to be present. In an embodiment, the processing circuit 510 generates the interrupt signal IRR when the object detection signal SCS is received twice within a predetermined time period, in which the predetermined time period can be such as, but not limited to, 15 seconds. As a result, besides the cooperative detecting mechanism of the image sensor and the infrared sensor, the processing circuit 510 can control the transmission of the interrupt signal IRR to further reduce the possibility of misjudgment to avoid the unnecessary power dissipation of the second chip CP2.

In an embodiment, the processing circuit 510 is also configured to modify the image variation threshold IT, the infrared energy variation threshold RT and the predetermined value PT of the predetermined time period stored in the register 160.

It is appreciated that the embodiments illustrated in FIG. 4 and FIG. 5 are merely two usage scenarios of the object detection apparatus 100. In other embodiments, the object detection apparatus 100 may be applied to the electronic devices having other configurations. The present invention is not limited thereto.

Figure 6:
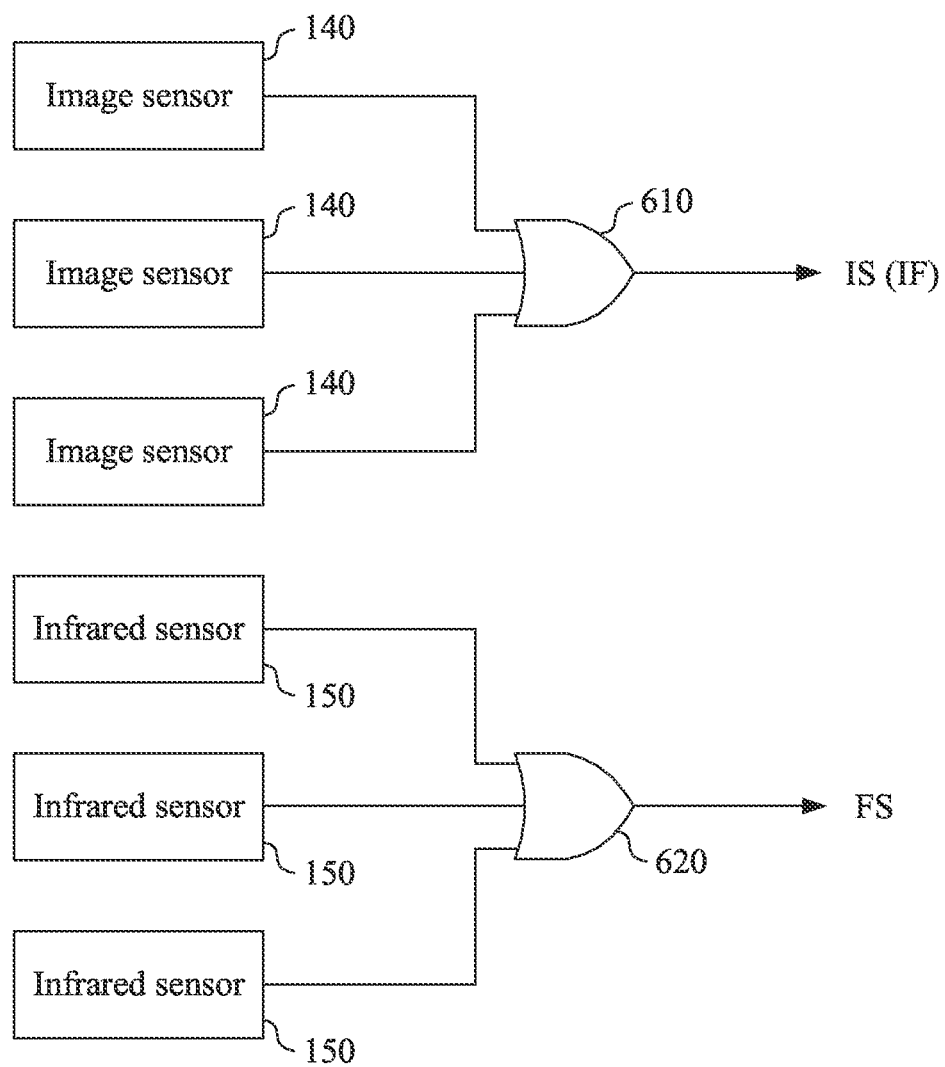
FIG. 6 illustrates a schematic diagram of the image sensors and the infrared sensors according to another embodiment of the present invention.

Reference is now made to FIG. 6. FIG. 6 illustrates a schematic diagram of the image sensors 140 and the infrared sensors 150 according to another embodiment of the present invention.

In an embodiment, the numbers of the image sensors 140 and the infrared sensors 150 are more than one. For example, in FIG. 6, the number of the image sensors 140 is three and the number of the infrared sensors 150 is also three. A logic gate 610 may perform OR logic operation on the image detection results of the plurality of image sensors 140 and transmit a final result in the form of the image signal IS to the motion detection circuit 110. A logic gate 620 may perform OR logic operation on the infrared detection results of the plurality of infrared sensors 150 and transmit a final result in the form of the infrared signal FS to the infrared control circuit 120.

As a result, the motion detection circuit 110 can generate the image detection signal IDS when any one of the image sensors 140 detects the image variation. The infrared control circuit 120 can generate the infrared detection signal FDS when any one of the infrared sensors 150 detects the infrared energy variation.

Figure 7:
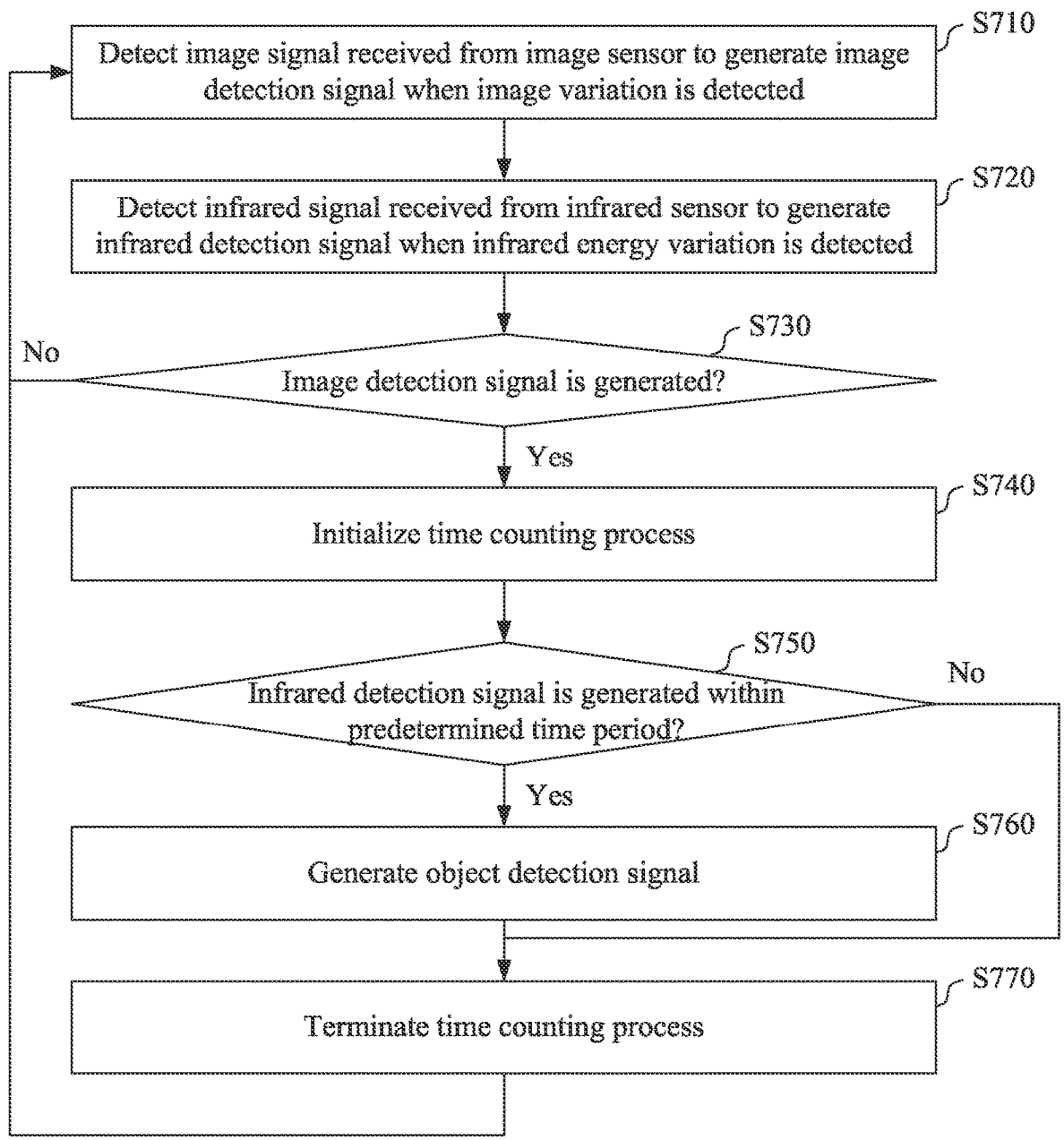
FIG. 7 illustrates a flow chart of an object detection method according to an embodiment of the present invention.

Reference is now made to FIG. 7. FIG. 7 illustrates a flow chart of an object detection method 700 according to an embodiment of the present invention.

In addition to the apparatus described above, the present disclosure further provides the object detection method 700 that can be used in such as, but not limited to, the object detection apparatus in FIG. 1 or FIG. 6. The object detection apparatus 100 in FIG. 1 is used as an example to describe the object detection method 700. As illustrated in FIG. 7, an embodiment of the object detection method 700 includes the following steps.

In step S710, the image signal IS received from the image sensor 140 is detected to generate the image detection signal IDS when the image variation is detected.

In step S720, the infrared signal FS received from the infrared sensor 150 is detected to generate the infrared detection signal FDS when the infrared energy variation is detected.

In step S730, whether the image detection signal IDS is generated is determined.

When the image detection signal IDS is not generated, the flow goes back to step S710 to further perform image detection.

In step S740, when the image detection signal IDS is generated, the time counting process is initialized.

In step S750, whether the infrared detection signal FDS is generated within the predetermined time period after the time counting process is initialized is determined.

In step S760, when the infrared detection signal FDS is generated within the predetermined time period after the time counting process is initialized, the object detection signal SCS is generated.

In step S770, the time counting process is terminated and the flow goes back to step S710 to perform detection.

In an embodiment, when the infrared detection signal FDS is determined to be not generated within the predetermined time period after the time counting process is initialized in step S750, the flow also goes to step S770 to terminate the time counting process. The flow further goes back to step S710 to renew detection.

It is appreciated that the embodiments described above are merely an example. In other embodiments, it should be appreciated that many modifications and changes may be made by those of ordinary skill in the art without departing from the spirit of the invention.

In summary, the object detection apparatus and the object detection method of the present invention can greatly reduce the possibility of misjudgment by using the cooperative detecting mechanism of the image sensor and the infrared sensor to further avoid unnecessary power dissipation.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. An object detection method used in an object detection apparatus, comprising:
    detecting an image signal received from an image sensor to generate an image detection signal when an image variation is detected, wherein the image detection signal is generated by a motion detection circuit;
    detecting an infrared signal received from an infrared sensor to generate an infrared detection signal when an infrared energy variation is detected, wherein the infrared detection signal is generated by an infrared control circuit;
    initializing a time counting process when the image detection signal is generated, wherein the time counting process is performed by a counter;
    generating an object detection signal when the infrared detection signal is generated within a predetermined time period after the time counting process is initialized, wherein the object detection signal is generated by a confirming circuit, and the motion detection circuit, the infrared control circuit, the confirming circuit and the counter are disposed in a first chip; and
    generating a wake-up signal according to the object detection signal to wake up a second chip, wherein the second chip has a power dissipation higher than the power dissipation of the first chip;
    wherein a detection distance of the image sensor is larger than a detection distance of the infrared sensor.

2. The object detection method of claim 1, further comprising:
    terminating the time counting process when the infrared detection signal is not generated within the predetermined time period after the time counting process is initialized, or when the object detection signal is generated within the predetermined time period after the time counting process is initialized.

3. The object detection method of claim 1, wherein the step of detecting the image signal comprises calculating an image variation amount according to a plurality of images of the image signal such that the image detection signal is generated when the image variation amount is larger than an image variation threshold; and the step of detecting the infrared signal further comprises calculating an infrared energy variation amount of the infrared signal such that the infrared detection signal is generated when the infrared energy variation amount is larger than an infrared energy variation threshold.

4. The object detection method of claim 3, further comprising:

providing a register; and storing a predetermined value of the predetermined time period, the image variation threshold and the infrared energy variation threshold.

5. The object detection method of claim 3, wherein the step of detecting the image signal further comprises:

determining a background image according to the images of the image signal; and performing a sum of absolute differences calculation according to the background image and a current image of the images by using a block as a unit to generate the image variation amount.

6. The object detection method of claim 1, further comprising:

performing an image optimization process on the image signal;

wherein the step of detecting the image signal is performed according to the optimized image signal.

7. The object detection method of claim 1, further comprising:

generating an interrupt signal to wake up the second chip to process the interrupt signal by a processing circuit when the processing circuit determines that the object detection signal is received twice within a predetermined time period.

8. An object detection apparatus, comprising:

a motion detection circuit configured to detect an image signal received from an image sensor to generate an image detection signal when an image variation is detected;

an infrared control circuit configured to detect an infrared signal received from an infrared sensor to generate an infrared detection signal when an infrared energy variation is detected; and a confirming circuit configured to initialize a time counting process performed by a counter when one of the image detection signal and the infrared detection signal is generated, and generate an object detection signal when the other one of the image detection signal and the infrared detection signal is generated within a predetermined time period after the time counting process is initialized;

wherein the motion detection circuit, the infrared control circuit, the confirming circuit and the counter are disposed in a first chip, and the confirming circuit is further configured to generating a wake-up signal according to the object detection signal to wake up a second chip having a power dissipation higher than the power dissipation of the first chip.

9. The object detection apparatus of claim 8, wherein a detection distance of the image sensor is larger than a detection distance of the infrared sensor.

10. An object detection method used in an object detection apparatus, comprising:

detecting an image signal received from an image sensor to generate an image detection signal when an image variation is detected, wherein the operation of detecting the image signal comprises:

determining a background image according to a plurality of images of the image signal;

performing a sum of absolute differences calculation according to the background image and a current image of the images by using a block as a unit to generate an image variation amount; and generating the image detection signal when the image variation amount is larger than an image variation threshold;

detecting an infrared signal received from an infrared sensor to generate an infrared detection signal when an infrared energy variation is detected, wherein the operation of detecting the infrared signal comprises calculating an infrared energy variation amount of the infrared signal such that the infrared detection signal is generated when the infrared energy variation amount is larger than an infrared energy variation threshold;

initializing a time counting process when one of the image detection signal and the infrared detection signal is generated; and generating an object detection signal when the other one of the image detection signal and the infrared detection signal is generated within a predetermined time period after the time counting process is initialized.

* * * * *